United States Patent Office 2,860,116
Patented Nov. 11, 1958

2,860,116

PROCESS FOR PEPTIZING DIENE HYDROCARBON ELASTOMERS AND PRODUCT THEREOF

Josef Pikl, Glassboro, N. J., assignor to E. I. du Pont de Nemours and Company, Wilmington, Del., a corporation of Delaware No Drawing. Application July 29, 1954
Serial No. 446,653

9 Claims. (Cl. 260—30.2)

This invention relates to the processing of rubber, and more particularly to a process for peptizing elastomers of the group consisting of natural rubber and butadiene-styrene polymers.

Natural rubbers and most types of synthetic rubbers derived from conjugated dienes can be peptized, that is, made more plastic and more soluble in organic solvents, by mechanical working in the presence of air or oxygen, the extent of the change usually depending on the time, temperature and vigor of this working. In order to reduce the time and power required as well as to prevent deterioration of the rubber due to "over-milling," a wide variety of chemical agents discovered during the last quarter century can be added. These include phenyl hydrazines and their derivatives, aryl mercaptans and their divalent heavy metal salts, and certain diaryl disulfides. Although many of these have been widely accepted in the industry they exhibit two objections, one or both of which apply to each such agent now used. First, they must be used in fairly large amounts and since they are rather expensive their use substantially increases the cost of the plasticized elastomer, partly offsetting the savings which would be expected from the shorter milling times and lower power consumption. Second, in general they have unpleasant odors and often exhibit toxic effects when in contact with the skin, or inhaled. Hence, special precautions must be taken to protect those working with such compounds. In some cases the finished rubber articles still have an objectionable ordor, and cannot be used where there is the possibility of causing dermatitis.

A considerable advance was made in the discovery that certain organic nickel salts increase the effectiveness of aromatic mercaptans and aromatic mercaptides of divalent heavy metals (see U. S. Patent 2,609,404 and 2,609,405) and of di(orthoacylaminoaryl) disulfides (see U. S. Patent 2,658,091) in plasticizing rubber to such an extent that the cost of the plasticizing material and the odor and toxicity are much reduced. In some cases, however, the nickel salts accelerate the aging (oxidation) of cured stocks derived from the elastomers in which they have been used, and while this effect is observed only in rather isolated cases, it nevertheless works against the general acceptance of peptizing agents containing nickel. There is still a need for an odorless and nontoxic peptizing agent, effective in small amounts, which will not accelerate oxidation.

It is therefore an object of this invention to provide a process for peptizing rubber and butadiene-styrene elastomers in which process a substantially odorless and nontoxic peptizing agent is employed. A further object of the invention is to provide readily processable elastomers containing iron phthalocyanine as the peptizing agent.

According to the present invention, natural rubber or butadiene-styrene elastomers (generally known in the trade as GR–S rubber) is plasticized by incorporating therein from 0.0005% to 0.5% of an iron phthalocyanine or its simple substitution derivatives such as iron chlorophthalocyanines and iron nitrophthalocyanines, which terms are used to include compounds which generate the iron phthalocyanine under the peptizing conditions such as the so-called leuco derivatives of these phthalocyanines, as more particularly identified hereinafter, based on the weight of the elastomer, either as the sole peptizing agent or in combination with from 0.005% to 5.0% of the known rubber peptizing agents of the class consisting of hydrazines or their derivatives, aryl mercaptans and their divalent heavy metal salts, arylene mercapto thiazoles or their mercapto compounds, aromatic sulfides and aromatic nitroso compounds, etc.

The iron phthalocyanine may constitute from 100% to as little as 1% or less of the total peptizing agent used. The ratio of the iron phthalocyanine to other peptizing agent employed, or the use of iron phthalocyanine as the sole peptizing agent, depends on such considerations as the relative cost of the iron phthalocyanine and the other peptizing agents used with it, the effectiveness of the particular combination used, and the amount of iron which is safe to use with the elastomer being considered. Using a constant total weight of a mixed peptizer, the greatest effect is usually obtained with about 10% of iron phthalocyanine. By using enough of such mixtures in large enough amount, almost any degree of peptizing may be obtained, down to products which are actually fluid. However, iron phthalocyanine when used alone even in large amounts gives the unique effect of not peptizing beyond the stage of a moderately soft rubber. Accordingly, its use alone is particularly safe and advantageous where peptizing must not be carried beyond this point.

The iron phthalocyanine may be prepared by any of the usual methods such as disclosed in U. S. Patent 2,000,-051, U. S. Patent 2,124,419, U. S. Patent 2,197,458, U. S. Patent 2,214,477, and British Patent 322,169. Its chloro and nitro derivatives are also well known in the art and their preparation is described in prior publications. The iron phthalocyanine employed in the following examples was produced by heating phthalic anhydride, urea and anhydrous ferric chloride in trichlorobenzene in the presence of ammonium molybdate as the catalyst, the iron phthalocyanine being isolated in the usual manner by drowning the reaction mass in a dilute sodium carbonate solution, distilling off the trichlorobenzene, filtering, and washing the product alkali-free and drying.

The leuco derivatives of the iron phthalocyanine compounds mentioned above include the precursors and the propigments. The precursors of the iron phthalocyanines may be made from phthalonitrile and anhydrous ferrous chloride, as more particularly described for the preparation of the precursors of other metal phthalocyanines in U. S. patent application Serial No. 252,401, filed October 20, 1951, by G. Barnhart and B. F. Skiles (owned by the assignee of the present application), and more particularly as follows:

Anhydrous ferrous chloride (58 parts) was suspended in 372 parts of ethylene glycol monoethyl ether and saturated with ammonia. Phthalonitrile (200 parts) and methyl glucamine (12 parts) were then added and the mixture was heated for 16 hours at 90° C. The reaction mass was then filtered and drowned in water. The brown precipitate resulting was purified by extraction with hot methanol and contained, after this treatment, 5.7% Fe, 62.0% C and 3.2% H. It is a grayish-brown, insoluble powder.

The propigments may be made by chlorination of the iron phthalocyanines in alcoholic solution, as more particularly described for the preparation of the propigments of other metal phthalocyanines in U. S. Patent 2,662,896, or more specifically as follows:

Iron phthalocyanine (12.5 parts) suspended in 200 parts of methanol was treated with 4 parts of chlorine over a period of 1 hour. The small amount of residual unreacted iron phthalocyanine was filtered off and the resulting solution was drowned in dilute hydrochloric acid. The precipitated product was washed with water and dried, forming a light yellow powder containing 8.4% Fe, and soluble in benzene, chloroform and similar solvents. When heated in solution in xylene or orthodichlorobenzene, the iron phthalocyanine was regenerated as a dark blue precipitate. The same change was brought about by reducing agents such as ascorbic acid and sodium hydrosulfite.

The iron phthalocyanine and the nitro and chloro derivatives employed in the following examples had a particle size, as determined by an electron microscope, principally between 0.05 and 0.10 micron, and a specific surface determined by nitrogen absorption of about 60 square meters per gram. This finely divided material was produced by salt milling in accordance with the procedure described in U. S. Patent 2,402,167. While the phthalocyanine compounds of larger particle size may be employed in this invention, when they are too coarse they are less effective per unit weight and therefore the particle size within the range given above is preferred.

The chemical peptizing agents with which the iron phthalocyanine may be employed may be any of the known classes of peptizing agents, such as:

(1) Unsymmetrically substituted hydrazines, particularly phenyl hydrazine, and their derivatives such as salts with both inorganic and organic acids, their reaction products with ketones and with carbon disulfide, and their addition products with metal salts, as described in U. S. Patents 2,018,643 and 2,132,505;

(2) Aryl mercaptans (U. S. Patent 2,064,580) and certain of their divalent heavy metal salts;

(3) Other mercapto compounds and their derivatives such as arylene mercapto thiazoles (U. S. Patent 2,190,587), thienyl mercaptans (U. S. Patent 2,504,903), mercapto acids, esters, amides and ketones of the aromatic series, and acyl derivatives of such mercapto compounds (U. S. Patent 2,629,755), and zinc salts of such mercapto compounds;

(4) Certain aromatic disulfides, particularly di(orthoacylaminoaryl)disulfides (U. S. Patent 2,470,948) and also dibenzoyl disulfide and dibenzothiazyl disulfide; and (5) Certain aromatic nitroso compounds such as nitrosobetanaphthol.

No rubber peptizing agents have been found with which the iron phthalocyanine does not show an important improvement.

The following examples are given to illustrate the invention, in which the parts used are by weight, and the parts of the plasticizing agent or other rubber chemical employed are based on 100 parts of the elastomer being processed.

EXAMPLES

The peptizing agents of the present invention were tested, unless otherwise specified, as follows:

30 grams of rubber (smoked sheet) were milled on a 2 x 6 inch laboratory mill for 2 minutes at 135° C. and then the peptizing agent added and milled for 10 minutes. Williams plasticity values were obtained according to ASTM Method D–926–47T.

Table I

EFFECT OF IRON PHTHALOCYANINES ALONE ON THREE DIFFERENT LOTS OF NATURAL RUBBER HAVING PLASTICITY OVER THE USUAL RANGE OF VARIATION FOR NATURAL RUBBER STOCKS, AND OF THE DERIVATIVES AND LEUCO COMPOUNDS

EXAMPLE 1

| Iron Phthalocyanine, Parts/100 parts of rubber | Williams Plasticity Number |
| --- | --- |
| Lot A: | |
| 0.000 (Control) | 253 |
| 0.001 | 174 |
| 0.002 | 164 |
| 0.003 | 151 |
| 0.0167 | 99 |
| 0.033 | 96 |
| Lot B: | |
| 0.000 (Control) | 223 |
| 0.0167 | 108 |
| 0.033 | 101 |
| 0.10 | 91 |
| 0.30 | 81 |
| Lot C: | |
| 0.000 (Control) | 195 |
| 0.05 | 85 |
| 0.10 | 85 |
| 0.15 | 84 |
| 0.25 | 80 |

EXAMPLE 2

| Iron Trinitrophthalocyanine (From 4-nitro phthalimide and phthalic anhydride in a urea melt): | |
| --- | --- |
| 0.000 (Control) | 220 |
| 0.001 | 202 |
| 0.01 | 153 |
| 0.05 | 99 |

EXAMPLE 3

| Iron mono 4-chlorophthalocyanine: | |
| --- | --- |
| 0.000 (Control) | 191 |
| 0.0167 | 122 |
| 0.033 | 96 |
| 0.167 | 91 |
| 0.5 | 87 |

EXAMPLE 4

| Iron Phthalocyanine Precusor, Percent: | |
| --- | --- |
| 0.000 (Control) | 210 |
| 0.001 | 190 |
| 0.005 | 112 |
| 0.010 | 89 |

EXAMPLE 5

| Leuco Derivative of Iron Phthalocyanine: | |
| --- | --- |
| 0.000 (Control) | 250 |
| 0.001 | 157 |
| 0.005 | 98 |
| 0.010 | 88 |

As illustrated in the above examples, very small amounts of the iron phthalocyanines, or compounds which under conditions of use generate the iron phthalocyanine, when used alone are effective peptizers of rubber.

The effect of iron phthalocyanine on the action of known peptizing agents is illustrated in the following examples. These examples show that even as little as 1% of iron phthalocyanine in the mixture of peptizing agents greatly increases the effectiveness of the mixture and that this effect upon the mixture is greatest with about 10% phthalocyanine. Usually the mixtures are more effective than an equal weight of either pure peptizing agent alone.

Table II

EFFECT OF IRON PHTHALOCYANINE AND ZINC PENTACHLOROTHIOPHENOL IN VARIOUS PROPORTIONS IN NATURAL RUBBER

EXAMPLE 6

| Percent Iron Phthalocyanine in Mixture with Zinc Pentachlorothiophenol | Williams Plasticity Numbers, Using the Following Amounts of Plasticizing Mixtures in parts per hundred | | | | |
|---|---|---|---|---|---|
| | 0 | 0.05 | 0.10 | 0.15 | 0.25 |
| 0 (100% PCTP) | 195 | 155 | 131 | 92 | 85 |
| 1 | | 145 | 86 | 78 | 59 |
| 2 | | 106 | 84 | 72 | 53 |
| 5 | | 100 | 77 | 57 | 38 |
| 10 | | 78 | 57 | 43 | 33 |
| 20 | | 81 | 59 | 49 | 37 |
| 100 (No PCTP) | | 85 | 85 | 84 | 80 |

Table III

EFFECT OF IRON PHTHALOCYANINE UPON PEPTIZING OF NATURAL RUBBER IN ADMIXTURE WITH VARIOUS MERCAPTANS AND ZINC MERCAPTIDES

EXAMPLE 7

| Percent Iron Phthalocyanine in Mixtures with Pentachlorothiophenol | Williams Plasticity Numbers, Using the Following Amounts of Plasticizing Mixtures, in parts per hundred | | | | | | |
|---|---|---|---|---|---|---|---|
| | 0 | 0.05 | 0.10 | 0.15 | 0.20 | 0.25 | 0.50 |
| 0 | 200 | 172 | 93 | 80 | | 67 | |
| 1 | | 110 | 79 | 70 | | 57 | |
| 2 | | 109 | 78 | 63 | | 45 | |
| 5 | | 87 | 64 | 52 | | 36 | |
| 10 | | 79 | 59 | 45 | | 31 | |

EXAMPLE 8

| Percent Iron Phthalocyanine in Mixtures with Thiobetanaphthol: | | | | | | | |
|---|---|---|---|---|---|---|---|
| 0 | 212 | | 89 | | 74 | | 56 |
| 1 | | | 72 | | 41 | | 1 S |
| 5 | | | 54 | | S | | S |

EXAMPLE 9

| Percent Iron Phthalocyanine in Mixtures with Xylyl Mercaptan: | | | | | | | |
|---|---|---|---|---|---|---|---|
| 0 | 212 | | 112 | | 95 | | 76 |
| 1 | | | 77 | | 43 | | S |
| 5 | | | 53 | | S | | S |

EXAMPLE 10

| Percent Iron Phthalocyanine in Mixtures with Zinc Xylyl Mercaptide: | | | | | | | |
|---|---|---|---|---|---|---|---|
| 0 | 210 | | 130 | | | 94 | 79 |
| 1 | | | 85 | | | 54 | 33 |
| 5 | | | 49 | | | S | S |

EXAMPLE 11

| Percent Iron Phthalocyanine in Mixtures with Tetrachlorobenzenedithiol: | | | | | | | |
|---|---|---|---|---|---|---|---|
| 0 | | | 110 | | | | |
| 50 | | | 39 | | | | |

EXAMPLE 12

| Percent Iron Phthalocyanine in Mixtures with Mercaptobenzothiazole: | | | | | | | |
|---|---|---|---|---|---|---|---|
| 0 | 210 | | 140 | | | 92 | 80 |
| 1 | | | 95 | | | 65 | 47 |

EXAMPLE 13

| Percent Iron Phthalocyanine in Mixtures with o-Mercaptomethyl benzoate: | | | | | | | |
|---|---|---|---|---|---|---|---|
| 0 | | | 176 | | | 153 | 136 |
| 1 | | | 106 | | | 72 | 55 |

[1] S means the sample was too soft to give an accurate Williams number.

Table IV

EFFECT OF IRON PHTHALOCYANINE UPON PEPTIZING IN ADMIXTURE WITH OTHER TYPES OF PLASTICIZING AGENTS

EXAMPLE 14

| Percent Iron Phthalocyanine in Mixtures with Phenyl Hydrazine | William Plasticity Numbers Using the Following Amounts of the Plasticizing Mixtures, in parts per hundred | | | | | |
|---|---|---|---|---|---|---|
| | 0 | 0.1 | 0.2 | 0.25 | 0.3 | 0.5 |
| 0 | 220 | 163 | | 150 | | 129 |
| 1 | | 104 | | 84 | | 72 |
| 5 | | 76 | | 62 | | 51 |

EXAMPLE 15

| Percent Iron Phthalocyanine in Mixtures with Dibenzoyl Disulfide: | | | | | | |
|---|---|---|---|---|---|---|
| 0 | | 111 | | 76 | | |
| 1 | | 86 | | 55 | | |

EXAMPLE 16

| Percent Iron Phthalocyanine in Mixtures with o,o'-Dibenzamido Diphenyldisulfide: | | | | | | |
|---|---|---|---|---|---|---|
| 0 | 205 | 156 | 128 | | 100 | 76 |
| 1 | | 100 | 78 | | 63 | 37 |
| 5 | | 70 | 40 | | 27 | 1 S |
| 10 | | 48 | S | | S | S |

EXAMPLE 17

| Percent Iron Phthalocyanine in Mixtures with Dibenzothiazyl Disulfide: | | | | | | |
|---|---|---|---|---|---|---|
| 0 | | | | 183 | | |
| 1 | | | | 79 | | |

EXAMPLE 18

| Percent Iron Phthalocyanine in Mixtures with Nitrosobetanaphthol: | | | | | | |
|---|---|---|---|---|---|---|
| 0 | | | | 183 | | |
| 1 | | | | 111 | | |

EXAMPLE 19

| Percent Iron Phthalocyanine in Mixtures with Zinc o-benzamido Thiophenol: | | | | | | |
|---|---|---|---|---|---|---|
| 0 | 215 | 130 | 101 | | | 67 |
| 1 | | 75 | 50 | | | 27 |

[1] See footnote for Table III.

The following examples show the peptizing action of mixtures of iron phthalocyanine and known peptizing agents upon several types of synthetic rubber made from butadiene and styrene. These are GRS–1000, made by polymerizing at 50° C., GRS–1500, made at 5° C., and GRS–1700, which is GRS–1500 extended with 25% of hydrocarbon oil. Both GRS–1000 and –1500 contain 23.5% styrene and 76.5% butadiene. The peptizing was carried out as described above for natural rubber.

Table V
EFFECT OF MERCAPTOBENZOTHIAZOLE AND IRON PHTHALOCYANINE IN GRS RUBBER
EXAMPLE 20

| Parts per hundred | Williams Plasticity Numbers | | |
|---|---|---|---|
| | GRS 1000 | GRS 1500 | GRS 1700 |
| Mercaptobenzothiazole, 1.0 | 114 | 119 | 116 |
| Mercaptobenzothiazole, 0.975 +iron phthalocyanine, 0.025 | 73 | 73 | 85 |

Table VI
EFFECT OF IRON PHTHALOCYANINE ON THE PEPTIZING OF GRS-1000 RUBBER BY ZINC PENTACHLOROPHENYL MERCAPTIDE (AT 110° C. FOR 10 MINUTES)
EXAMPLE 21

| Parts of Peptizing Mixture (97.5% mercaptide and 2.5% iron phthalocyanine) | Williams Plasticity Numbers |
|---|---|
| 0 | 138 |
| 0.125 | 124 |
| 0.25 | 113 |
| 0.5 | 98 |

Since certain organic compounds of heavy metals are known to accelerate the aging (oxidation) of rubber, a rubber stock which had been peptized with iron phthalocyanine before curing was subjected to a standard accelerated againg test (ASTM Method D-572-48), using 300 lbs. pressure of oxygen at 70° C. The rubber was peptized with 0.033% of a mixture of 95 parts of pentachloro thiophenol and 5 parts of iron phthalocyanine, the Williams plasticity number falling from 148 to 84. It was then compounded as follows and cured:

| | Parts |
|---|---|
| Smoked sheet | 100 |
| Mercaptobenzothiazole | 0.6 |
| Dibutyl ammonium oleate | 0.5 |
| Zinc oxide | 10.0 |
| Titanium dioxide | 10.0 |
| Stearic acid | 2.0 |
| Mineral oil | 5.0 |
| Sulfur | 2.75 |
| Antioxidant (methylene bis-tertiary butyl-p-cresol) | 1.0 |

It was compared in the aging test with unpeptized rubber in the same stock and also with rubber which had been peptized to the same extent with pentachlorothiophenol alone, 0.1% being required. The following table gives the original tensile strength and the percent of it retained after varying aging periods, as a measure of resistance to aging.

Table VII
EFFECT OF IRON PHTHALOCYANINE ON AGING
EXAMPLE 22

| Peptizing Agent | Original Tensile | Percent of Tensile Retained after— | | | |
|---|---|---|---|---|---|
| | | 7 days | 14 days | 21 days | 28 days |
| None | 4,500 | 81 | 59 | 30 | 19 |
| Pentachlorothiophenol | 3,900 | 94 | 77 | 47 | 35 |
| Pentachlorothiophenol + Iron Phthalocyanine | 3,900 | 92 | 59 | 56 | 40 |

This shows that the peptizing mixture containing iron improves the aging, particularly for the longer periods in comparison with the unpeptized stock, and to some extent with the peptized stock containing no iron.

The peptizing mixtures can be used by merely adding the two components on the mill to the rubber or by preparing a physical mixture beforehand. It is often desirable to dilute the mixture with some inert material because of its great activity. As diluents there may be clay, diatomaceous earth, calcium carbonate, or oils and waxes.

A satisfactory product has been prepared by dissolving 200 parts by weight of pentacholorthiophenol in 1000 parts of a high melting wax and then adding 10 parts of finely divided iron phthalocyanine. Such a product can be readily flaked on a drum, or spray solidified giving small spheres of about 0.5 mm. diameter which are free flowing. A suitable fine powder consists of 195 parts of pentachlorothiophenol, 5 parts of iron phthalocyanine and 800 parts of finely divided clay.

Many closely analogous phthalocyanine compounds, such as copper phthalocyanine and metal-free phthalocyanine, when tested do not have the improved plasticizing action of the iron phthalocyanine compounds of this invention, nor to do they appear to enhance the action of the known peptizing agents. Other closely analogous iron compounds, such as iron acetyl-acetonate, iron isovalerylacetonate, dicyclopentadienyliron, iron naphthenate, hemoglobin, hematine and hemateine, also do not give the plasticizing action of the iron phthalocyanine of the present invention nor enhance the action of known plasticizing agents, illustrating that the present invention is quite specific.

It will be seen from the above examples that the use of a very small amount (1% to 10% of the agent) of iron phthalocyanine, or compounds which are converted to iron phthalocyanine under the conditions in which they are used, with a known peptizing agent increases the activity of the known peptizing agent to such an extent that one-fifth as much or less of the mixture of peptizing agents will produce substantially the same effect as the known agent when used alone. The diluted mixtures described above, containing, say, 20% active ingredient, may often be used in the same amounts as the undiluted known agent to produce the same effect. One result of this is that, when the known agent has strong odor or toxic effect when used in the ordinary proportions, it may be entirely satisfactory to use in the much smaller proportions made possible by the use of the iron phthalocyanine.

What is claimed is:

1. Process for peptizing a diene hydrocarbon elastomer of the group consisting of natural rubber and butadiene-styrene polymers, which comprises intimately incorporating into the elastomer from 0.0005% to 0.5% of a compound of the class consisting of iron phthalocyanine and its chloro and nitro derivatives.

2. A readily processable diene hydrocarbon elastomer obtained by the process of claim 1.

3. Process for peptizing a diene hydrocarbon elastomer of the group consisting of natural rubber and butadiene-styrene polymers, which comprises intimately incorporating into the elastomer from 0.0005% to 0.5% of a compound of the class consisting of iron phthalocyanine and its chloro and nitro derivatives together with from 0.005% to 5.0% of a known rubber chemical peptizing agent.

4. A readily processable diene hydrocarbon elastomer obtained by the process of claim 3.

5. Process for peptizing a diene hydrocarbon elastomer of the group consisting of natural rubber and butadiene-styrene polymers, which comprises intimately incorporating into the elastomer from 0.0005% to 0.5% of a compound of the class consisting of iron phthalocyanine and its chloro and nitro derivatives together with from 0.005% to 5.0% of pentachlorothiophenol.

6. A readily processable diene hydrocarbon elastomer obtained by the process of claim 5.

7. Process for peptizing a diene hydrocarbon elastomer of the group consisting of natural rubber and butadiene-styrene polymers, which comprises intimately incorporating into the elastomer from 0.0005% to 0.5% of a compound of the class consisting of iron phthalocyanine and its chloro and nitro derivatives together with from 0.005% to 5.0% of zinc xylyl mercaptide.

8. Process for peptizing a diene hydrocarbon elastomer of the group consisting of natural rubber and butadiene-styrene polymers, which comprises intimately incorporating into the elastomer from 0.0005% to 0.5% of a compound of the class consisting of iron phthalocyanine and its chloro and nitro derivatives together with from 0.005% to 5.0% of mercaptobenzothiazole.

9. Process for peptizing a diene hydrocarbon elastomer of the group consisting of natural rubber and butadiene-styrene polymers, which comprises intimately incorporating into the elastomer from 0.0005% to 0.5% of a compound of the class consisting of iron phthalocyanine and its chloro and nitro derivatives together with from 0.005% to 5.0% of zinc pentachlorothiophenol.

References Cited in the file of this patent

UNITED STATES PATENTS

| | | |
|---|---|---|
| 2,192,705 | Evans et al. | Mar. 5, 1940 |
| 2,695,898 | Lober et al. | Nov. 30, 1954 |